(12) United States Patent
Zhang et al.

(10) Patent No.: US 10,254,744 B2
(45) Date of Patent: Apr. 9, 2019

(54) TELEROBOTIC CONTROLLER

(71) Applicant: Intel Corporation, Santa Clara, CA (US)

(72) Inventors: Chao Zhang, Beijing (CN); Jiqiang Song, Beijing (CN); Zhanglin Liu, Beijing (CN); Hongmei Sun, Beijing (CN)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 15/121,120

(22) PCT Filed: Sep. 25, 2015

(86) PCT No.: PCT/CN2015/090780
§ 371 (c)(1),
(2) Date: Aug. 24, 2016

(87) PCT Pub. No.: WO2017/049610
PCT Pub. Date: Mar. 30, 2017

(65) Prior Publication Data
US 2017/0269572 A1    Sep. 21, 2017

(51) Int. Cl.
G05B 19/409    (2006.01)
B25J 13/06    (2006.01)
B25J 9/16    (2006.01)
G05B 19/042    (2006.01)

(52) U.S. Cl.
CPC .......... *G05B 19/409* (2013.01); *B25J 9/1689* (2013.01); *B25J 13/06* (2013.01); *G05B 19/0426* (2013.01); *G05B 2219/40099* (2013.01); *Y10S 901/01* (2013.01)

(58) Field of Classification Search
CPC ........ B25J 13/06; B25J 9/1689; B25J 9/1667; B25J 9/1674; G05B 19/0426; G05B 19/409; G05B 2219/40099; Y10S 901/01
See application file for complete search history.

(56) References Cited

U.S. PATENT DOCUMENTS

| | | | |
|---|---|---|---|
| 8,380,349 B1 * | 2/2013 | Hickman | G05D 1/0246 700/247 |
| 2014/0316566 A1 * | 10/2014 | Mazel | B25J 9/1671 700/250 |
| 2015/0017973 A1 * | 1/2015 | Gold | H04M 1/7253 455/420 |
| 2016/0191565 A1 * | 6/2016 | Healey | H04L 63/10 726/6 |

FOREIGN PATENT DOCUMENTS

| | | |
|---|---|---|
| CN | 103377545 A | 10/2013 |
| CN | 104199390 A | 12/2014 |
| CN | 104199390 B * | 12/2014 |
| CN | 104541517 A | 4/2015 |
| WO | WO-2012091814 A2 | 7/2012 |

OTHER PUBLICATIONS

English Translation for reference CN104199390B, Dec. 2014.*
"International Application Serial No. PCT/CN2015/090780, International Search Report dated May 27, 2016", 10 pgs.
"International Application Serial No. PCT/CN2015/090780, Written Opinion dated May 27, 2016", 7 pgs.

* cited by examiner

Primary Examiner — Rachid Bendidi
(74) Attorney, Agent, or Firm — Schwegman Lundberg & Woessner, P.A.

(57) ABSTRACT

Various systems and methods for controlling a robot are described herein.

18 Claims, 8 Drawing Sheets

TELEROBOTIC CONTROLLER

This application is a U.S. National Stage Application under 35 U.S.C. 371 from International Application Serial no. PCT/CN2015/090780, filed. Sep. 25, 2015, which is hereby incorporated by reference in its entirety.

TECHNICAL FIELD

Embodiments described herein generally relate to robots and in particular, to a system for a telerobotic controller.

BACKGROUND

Telerobotics is an area of robotics related to control of semi-autonomous robots from a distance. The field of telerobotics combines the fields of teleoperation and telepresence. Teleoperation is the field concerning operating a machine or robot from a distance. Telepresence is the field concerning user interfaces that allow the human operator to feel as if they were present, for example, from the view of the robot.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide mechanisms for implementing a telerobotic controller. The controller may be implemented in a user device with a display, such as a smartphone or a tablet. The user device is operable to directly control a robot or other semi-autonomous machine, present a video feed from the robot's point of view, and provide a user interface to create control commands for the robot. The robot may be configured to detect and interact with objects around it, and when such objects are "smart objects" the robot may further interface with the smart object. Some or all of the robot's interaction with a smart object may be configured and controlled by the user via the user device.

As robots become more prevalent in everyday life, they may be used at home, in the workplace, in commercial settings, and the like. Robots may be used to augment the abilities of the young, elderly, disabled, or handicapped people. Robots may be used in one setting, such as a home, or in a larger environment, such as a shopping mall or a school campus. While conventional robots may be used to interact with ordinary items, such as opening a door or fetching a package, what is needed is a simple mechanism to allow robots to interact with other electronic devices.

A smart object is a device that includes some electronic abilities that provide awareness, programmatic representation, and interaction. Awareness refers to the smart object's ability to sense, interpret, and react to events and other stimuli. The events may be from the physical world. Programmatic representation refers to the smart object's application and programming models, abstractions, application programming interfaces, data structures, and the like. Interaction refers to the smart object's ability to interact with a user or another device in terms of input, output, control, and feedback. Smart objects (also referred to as a smart device) may connect persistently or intermittently with other devices over wired or wireless connections. Examples of smart objects includes, but are not limited to kiosks, smart mugs, parking meters, thermostats, bedside patient monitors, and the like.

Figure 1:
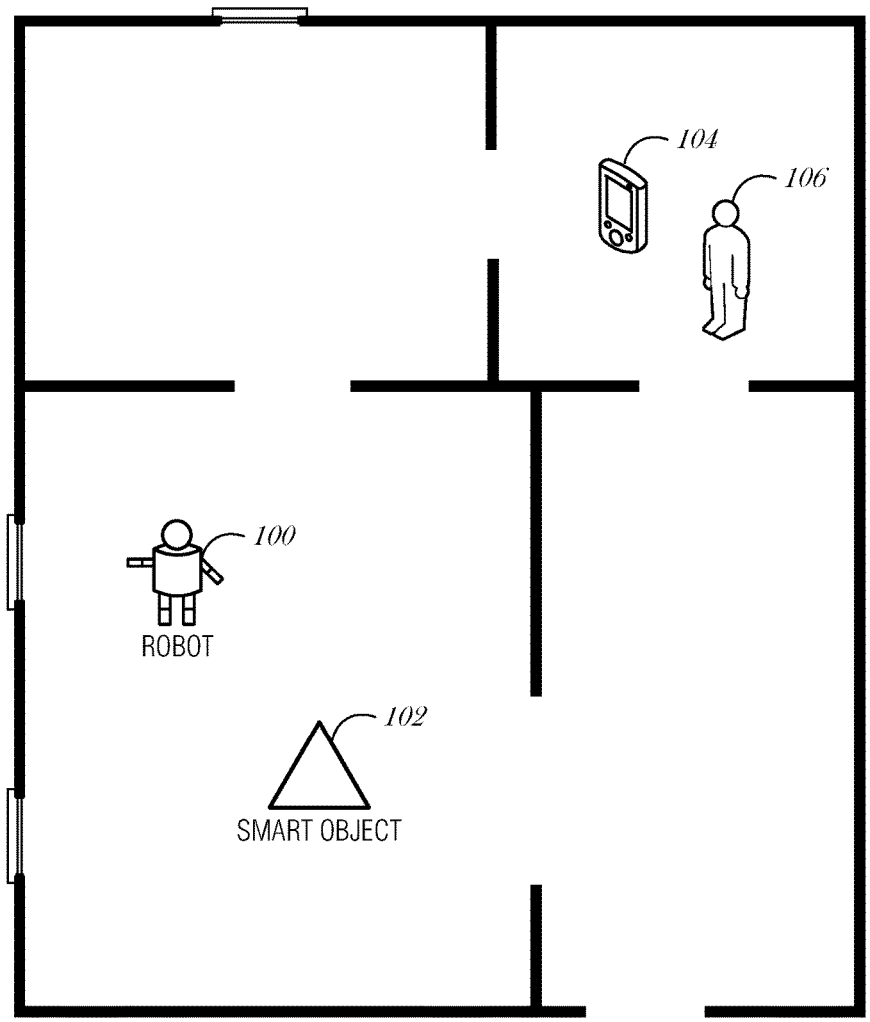
FIG. 1 is a diagram illustrating an interaction between a robot and a smart object, according to an embodiment.

FIG. 1 is a diagram illustrating an interaction between a robot 100 and a smart object 102, according to an embodiment. The robot 100 may be any type of self-propelled, mobile machine. The robot 100 may use various apparatus to move, such as wheels, treads, tracks, or the like. The robot 100 may also implement one or more legs to hop, walk, crawl, or otherwise move about an environment. The robot 100 may be an aerial vehicle, such as an unmanned aerial vehicle (UAV) or a drone and may include one or more rotors to enable aerial movement. The robot 100 includes a camera system, which may include one or more cameras. The camera system may include a visual light camera (e.g., an RGB camera), an infrared (IR) light camera, or other cameras. The IR camera may be used for night vision, as a depth camera, or for thermal imagery. In addition to the camera system, the robot 100 may also be equipped with other sensors, such as a sonar system, radar system, etc. (e.g., to navigate environments). The robot 100 may also include one or more communication systems, which may include a wireless networking communication system. The wireless networking communication system may use one or more of a variety of protocols or technologies, including Wi-Fi, 3G, and 4G LTE/LTE-A, WiMAX networks, Bluetooth, near field communication (NFC), or the like.

The smart object 102 may be any type of electronic device capable of communication and having some environmental awareness. Examples of a smart object 102 include thermostats, televisions, audio systems, lighting systems, refrigerators, security systems, and the like. The smart object 102 may be installed in the environment (e.g., a thermostat that is mounted on a wall and integrated with a heating and ventilation system) or moveable within the environment (e.g., a smart mug).

The robot 100 may be configured to periodically or regularly transmit a wireless signal using a discovery protocol to detect and identify smart objects 102 in the environment. Using a discovery, handshake, or other protocol, the robot 100 and the smart object 102 may establish a connection, verify one another's identity, authenticate, and the like. For example, the connection may be established over Bluetooth using pairing.

Alternatively, the robot 100 may use vision recognition to identify or recognize various objects. When the robot 100 recognizes a potential smart object, then the robot 100 may transmit a discovery protocol inquiry to determine whether the potential smart object is listening and available for interaction.

As part of the connection process, the robot 100 and the smart object 102 may exchange and configure an application programming interface (API). For example, the smart object 102 may provide the robot 100 a number of functions, abilities, characteristics, or other aspects of the smart object 102 that are exposed to the robot 100.

For the purposes of illustrative discussion, a smart mug will be used as an example smart object 102. A smart mug is a device able to be used as a container for liquids, and also including electronic sensors and input/output mechanisms. A smart mug may include a display mechanism, such as a touch-sensitive panel disposed at the outer surface of the smart mug, or just below the outer surface. The display mechanism may include an array of light-emitting diodes (LEDs) disposed below the touch-sensitive element in the touch-sensitive panel. The LEDs may be optionally grouped as an array of pixels, which each pixel includes individually-controllable red, green, and blue LEDs that may emit light in respective red, green, and blue portions of the electromagnetic spectrum. The electronics in the smart mug may also include a speaker embedded under the outer surface. The smart mug may also include one or more sensors, such as an accelerometer, motion sensor, thermometer, camera, or the like. The smart mug may include a rechargeable battery, which may be recharged when the mug is placed on a base.

As the robot 100 approaches the smart object 102 (e.g., smart mug), the robot 100 may broadcast a request, which the smart object 102 may respond to. In the response, the smart object 102 may indicate that it has a mechanism to display, a mechanism to play sounds, and a mechanism to sense temperature. The smart object 102 may provide function calls, such as get current_temp( ), display_text( ), or play_sound( ), which the robot 100 may use to access the internal functionality of the smart object 102.

The robot 100 is connected to a remote control 104 operated by a user 106. The remote control 104 includes a display, which may be a touch-sensitive display. The display may present a video feed from a camera installed on the robot 100. The user 106 may control the robot 100 in various ways depending the autonomy of the robot 100. For a robot 100 that has a low-level of autonomy or when the user 106 wants minute control, the user 106 may directly interact with the robot 100. Direct interaction provides the user 106 with nearly complete control over the movement of the robot 100. A semi-autonomous robot may operate using medium to high-level task directives, which the robot 100 interprets and executes using built-in intelligence. To the extent that the user 106 has to control the robot 100, the remote control 104 is used. The remote control 104 may be any type of user device including, but not limited to a mobile phone, a smartphone, a phablet, a tablet, a personal digital assistant, a laptop, a digital camera, a desktop computer, or the like. While some embodiments include a remote control 104 that has a touchscreen interface, it is understood that any type of interface may be used, including keyboard, mouse, gesture, pen, etc.

When the robot 100 interfaces with the smart object 102 and obtains an API, the robot 100 may communicate with the remote control 104 to present a user interface to the user 106. The user interface allows the user 106 to control the robot 100 and its interaction with the smart object 102, based on the functions and abilities exposed by the smart object 102.

Figure 2:
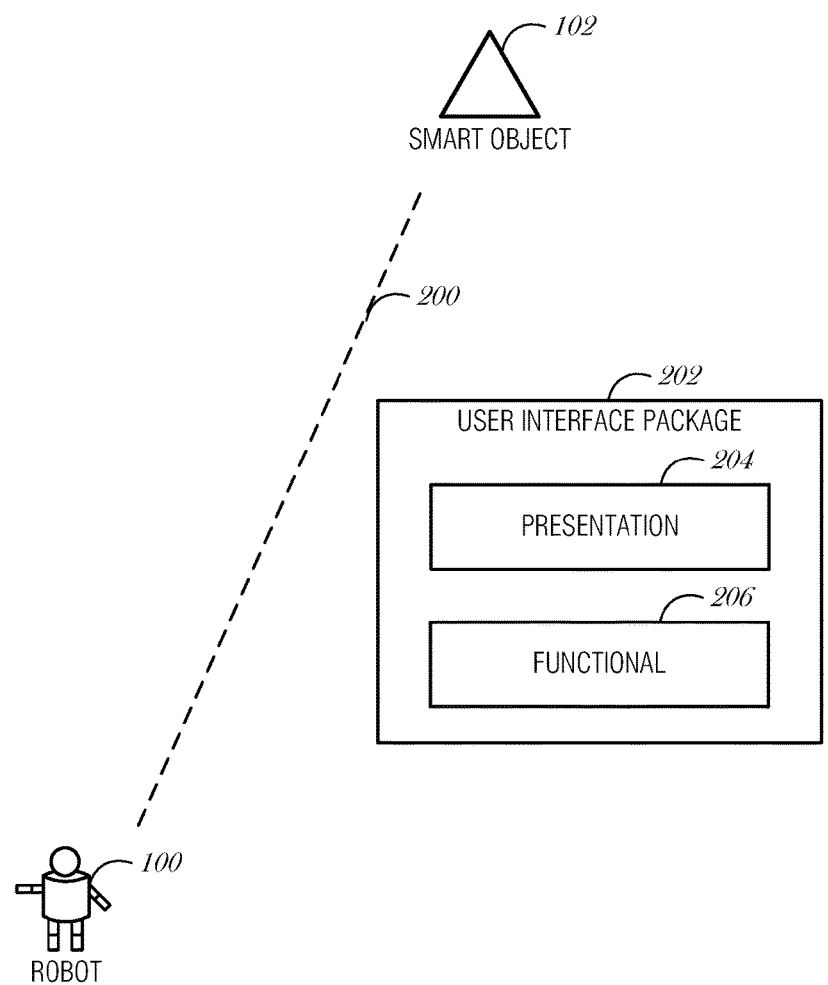
FIG. 2 is a block diagram illustrating the API architecture, according to an embodiment.

FIG. 2 is a block diagram illustrating the API architecture, according to an embodiment. After the robot 100 establishes a communication session with the smart object 102 over a connection 200, one or more user interface packages 202 are sent from the smart object 102 to the robot 100. The communication session may be established using various protocols or mechanisms, such as remote procedure call (RPC), Hypertext Transfer Protocol (HTTP), or the like. The user interface package includes two components, a presentation component 204 and a functional component 206.

The presentation component 204 is used to create a user interface control on the remote control 104 for the user 106. The presentation component 204 may include various design elements of a user interface control, such as a description, shape, type of control (e.g., dropdown list, command button, radio button, label, etc.), color, border size, font, and the like. The presentation component 204 is used by the remote control 104 to create a visible node on the display of the remote control 104. The presentation component 204 is also used to create connection points on the node, with an optional input connection point and an optional output connection point. Multiple connection input or output connection points may be available on the node. Using the connection points, the user 106 may manipulate the node to connect it to data (e.g., received from sensors), constant values, comparison operators, looping and control structures, and the like, so that the user 106 may visually construct programmatic control for the robot 100 or the smart object 102.

The functional component 206 of the user interface package 200 provides the underlying functionality to support the actions defined by the user 106 when arranging or organizing the presentation components 204. The functional component 206 is used to send commands to or receive data from smart object 102 via the communication session between the robot 100 and smart object 102. The functional component 206 also handles input from some presentation components 204 and sends output to other presentation components 204. The functional component 206 may also be used to control the robot 100. Additionally, the functional component 206 may alter the state of the presentation component 204, which may update the presentation component 204 (e.g., change display or change state of control).

Thus, through interaction with the presentation components 204, the user 106 is able to program underlying functionality (e.g., functional component 206) to control the robot 100 or the smart object 102. It is understood that the user 106 may control more than one smart object 102 and may control more than one robot 100 using the mechanisms described here.

Figure 3:
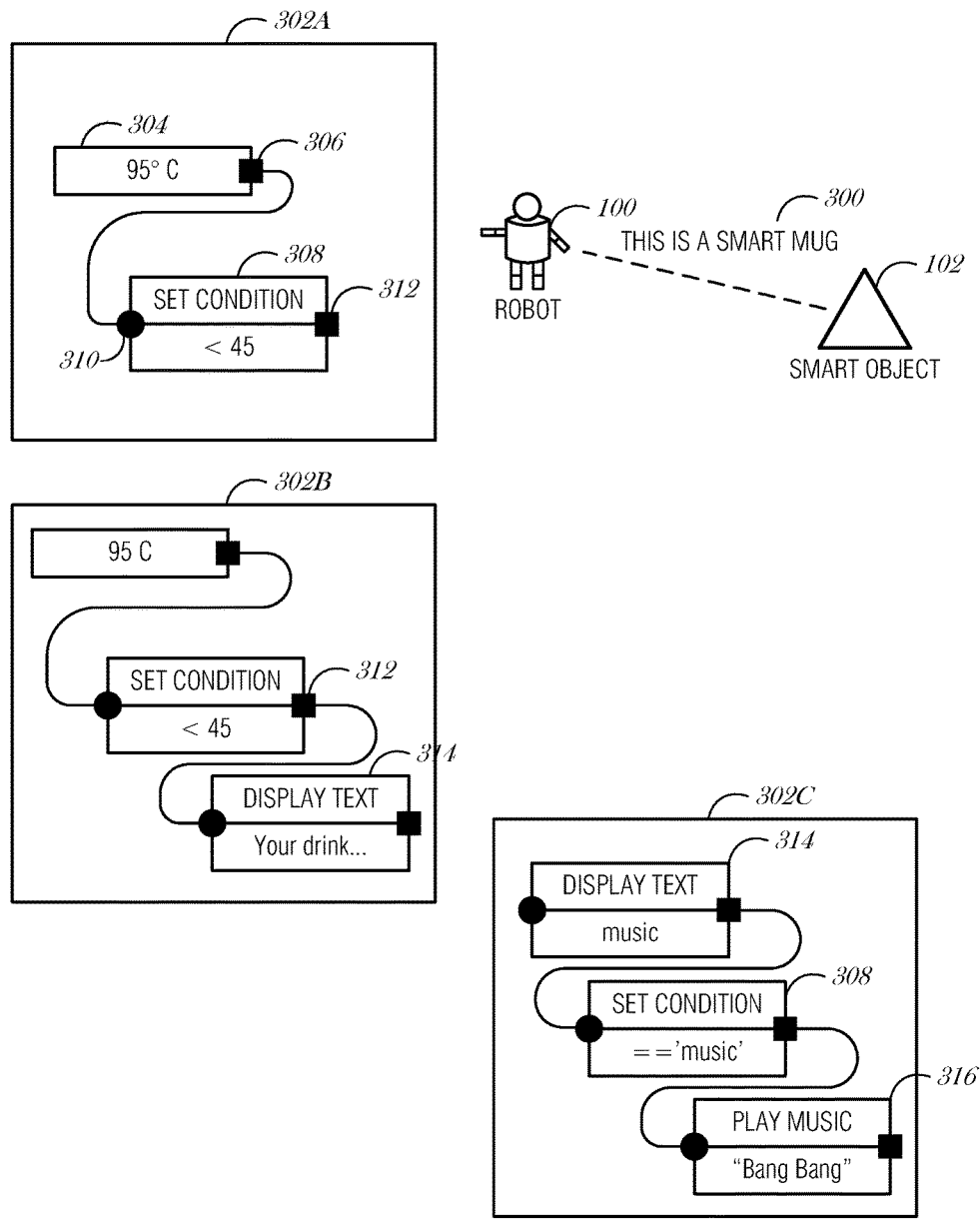
FIG. 3 is an example of a control and data flow, according to an embodiment.

FIG. 3 is an example of a control and data flow, according to an embodiment. The robot 100 may connect with the smart object 102, which identifies itself as a smart mug (operation 300). Some information, which may include user interface packages 202, may be exchanged between the smart object 102 and the robot 100. For example, the smart object 102 may have a temperature sensor, a speaker, a microphone, and a screen. The smart object 102 may communicate one or more user interface packages 202 to the robot 100 that expose data, functions, or other aspects of the smart object 102. One or more user interfaces may be provided by the robot 100 based on functionality of the smart object 102.

User interface 302A may include the data from the temperature sensor in a data user interface control 304. The temperature sensor may be used to indicate the approximate temperature of the contents of the smart mug. The user interface package 202 associated with the temperature sensor may include a presentation component 204 to display the temperature in a certain font, format (e.g., using Fahrenheit or Celsius), or the like. The functional component 206 associated with the temperature sensor may include a mechanism to store and retrieve the temperature data. The data user interface control 304 may include an output connector 306. Being a data user interface control 304, it may not include an input connector. Input and output connectors are used to visually arrange and connect user interface controls so that the user may control data and control flow in robot programming.

A condition user interface control 308 may be provided by the robot 100 and displayed on the remote control 104 to the user 106. The condition user interface control 308 allows the user to create a conditional control based on a data input. The condition user interface control 304 includes an input connector 310 and an output connector 312. In this example, the condition user interface control 308 is set to use the data of the data user interface control 304 as input. The output connector 312 may then be connected to another function (exposed by the robot 100 or smart object 102) or another condition user interface control 308. The condition user interface control 308 may include various properties, such as the conditional operator (e.g., greater than, less than, equal, is a set of, is not a set of, etc.) and operands. In this case, the operand is set to "45" and the conditional operator is set to "<" (less than).

After the user 106 connects the data user interface control 304 with the condition user interface control 308, the user 106 may select another user interface control to connect with the output connector 312. The user 106 may be presented a list of available controls from a palette, toolbar, or other organized area. In this example, the user interface 302A may be updated to user interface 302B, where the user 106 drags and drops a display text user interface control 314. The display text user interface control 314 may be provided by the smart object 102 based on the functionality of being able to display output on the screen. The display text user interface control 314 may have properties, such as the text to display, font, color, style, scrolling, etc. The user 106 may set these properties of the display text user interface control 314. In this example, the user 106 may enter "You're drink is getting cold" as the text to display as a result of the condition set by the condition user interface control 308.

After arranging the data user interface control 304, condition user interface control 308, and display text user interface control 314, the user 106 may save or commit the program, which is then saved at the robot 100. The robot 100 may then periodically query the smart object 102 for the temperature, then when the temperature violates the threshold provided in the condition user interface control 308, the robot 100 may cause the smart object 102 to display the text provided by display text user interface control 314.

User interface 302C illustrates an example with a display text user interface control 314 triggering another state on the smart object 102. The user 106 may add the display text user interface control 314 with the text "music." The user 106 may then add a condition user interface control 308 and connect it to the display text user interface control 314 so that when the display text user interface control 314 displays "music," then an action is taken. In this example, a play music user interface control 316 is available from the smart object 102. The user 106 may set the music or other audio to be played based on the play music user interface control 316 properties. Once the display text user interface control 314, condition user interface control 308, and play music user interface control 316 are configured, the user 106 may save the program to the robot 100. The result of the program illustrated in the user interface 302C is that when the text music is input at the smart object 102, such as by drawing on a touchscreen, then the robot 100 detects the state of the displayed text and evaluates the condition set in the condition user interface control 308. If the condition evaluates to TRUE, then the robot 100 directs the smart object 102 to begin playing music using the play music user interface control 316. The smart object 102 may then begin outputting the music from its speaker.

While the examples illustrated in FIG. 3 are using one robot and one smart object, it is understood that multiple robots or multiple smart objects may be used. For example, a person changing the state of one smart object may be detected by a robot, which may then direct another smart object to perform an action based on the programming provided by a user.

Figure 4:
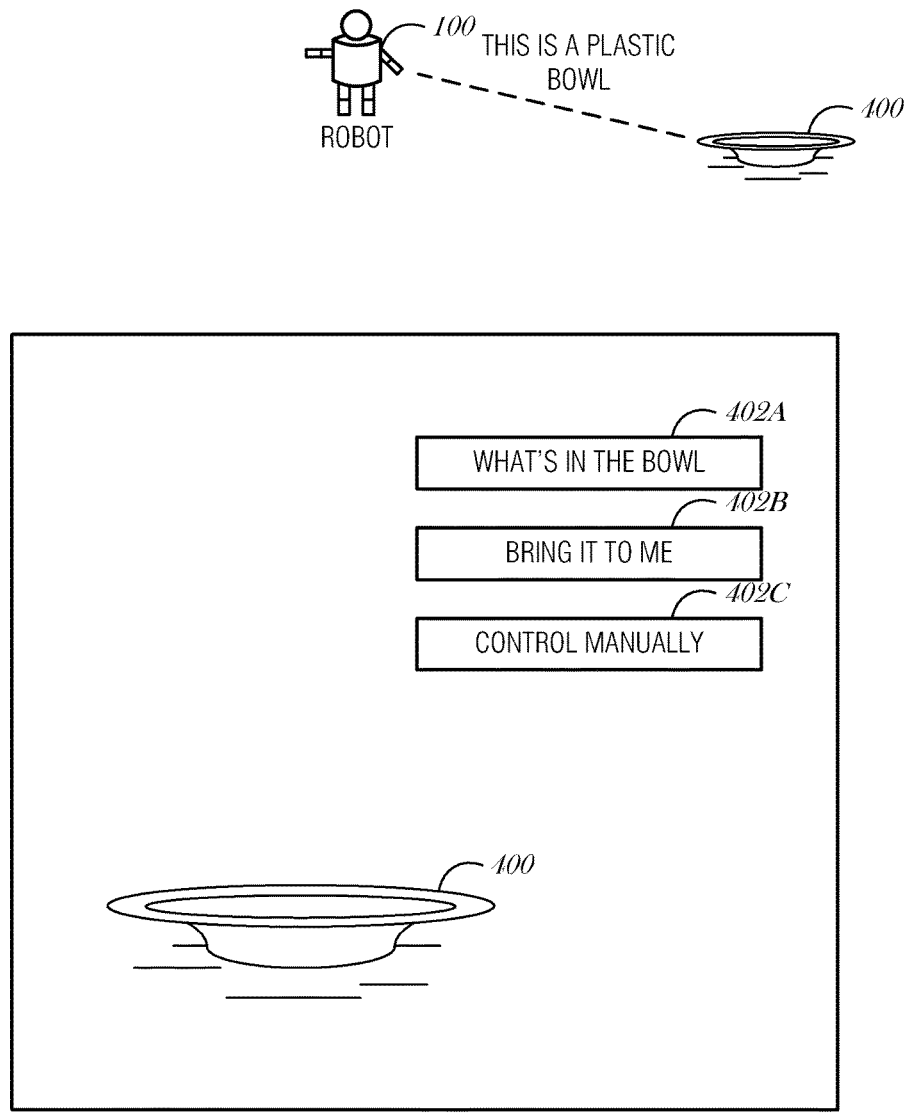
FIG. 4 is an example of a user interface and implementation, according to an embodiment.

FIG. 4 is an example of a user interface and implementation, according to an embodiment. In FIG. 3, the robot 100 was interacting with smart object 102. In the example illustrated in FIG. 4, the robot 100 interacts with a regular object 400. The regular object 400 may be an electronic device that is not configured to interact with robot 100. In other cases, the regular object 400 is a non-smart object (e.g., a plastic bowl without any electronics). When interacting with a regular object 400, the robot 100 may provide a different user interface to the user 106. Based on the level of autonomy, the user 106 may provide various commands. For example, the robot 10) may provide controls 402A, 402B, 402C, which the user 106 may interact with on the remote control 104.

For example, if the user 106 selects control 402A, the robot 100 may inspect the regular object 400 using various methods, such as with visual inspection and object recognition, auditory inspection, olfactory inspection, or the like. If the user 106 selection control 402B, the robot 100 may pick up and fetch the regular object 400 to the user 106. The control 402C may be used by user 106 to take control of the robot 100 and operate it manually in a direct interaction mode. As the user 106 control the robot 100 in direct interaction mode, the camera system on the robot 100 may provide a video feed, which is presented in the user interface. For example, the user 106 may drag the bowl (e.g., regular object 400) in the user interface and the robot 100 may act to move the mug in a corresponding fashion. Alternatively, the user 106 may control one or more functions of the robot 100 directly, such as by moving the robot's position, actuating arms, changing camera view, altering the height or orientation of the robot 100, or the like.

Figure 5:
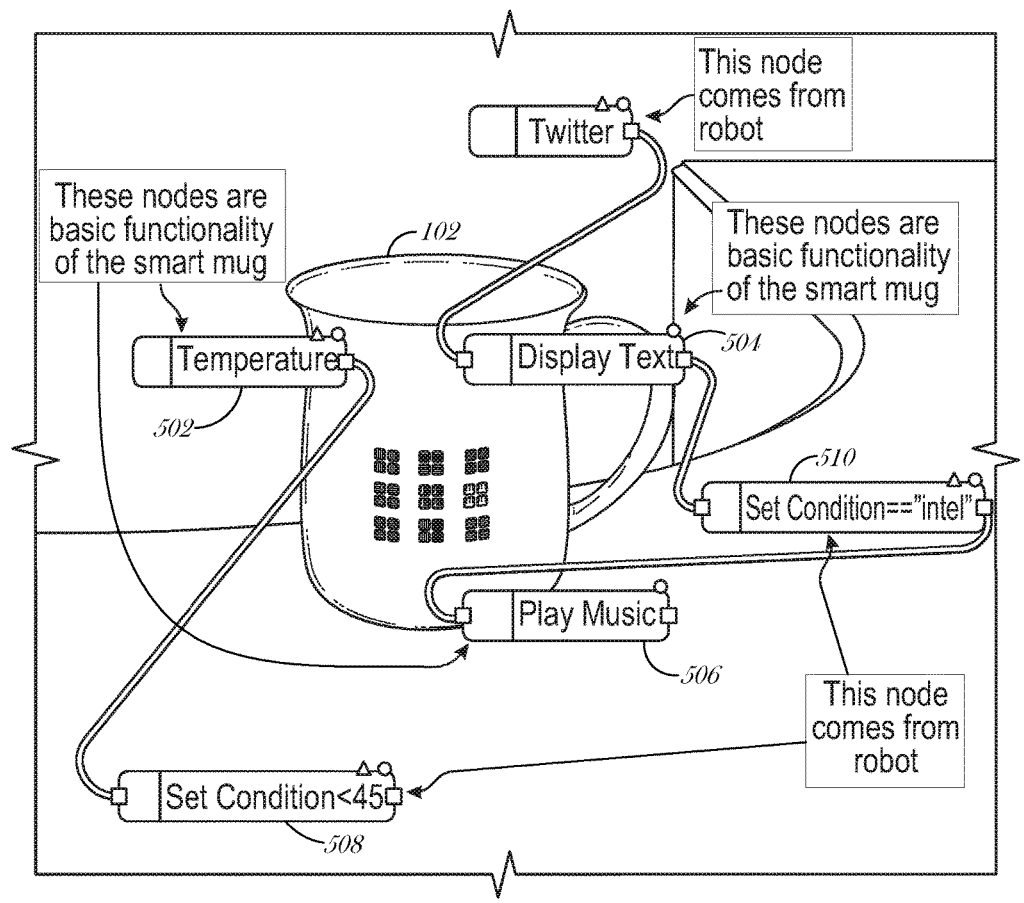
FIG. 5 is an example of a user interface, according to an embodiment.

FIG. 5 is an example of a user interface 500, according to an embodiment. The user interface 500 is overlaid on top of a video feed provided by a robot 100. The video feed includes a smart mug (e.g., smart object 102). The user interface 500 provide the user interface controls that are available from the smart mug. For example, the temperature control 502, display text control 504, and play music control 506 are illustrated in the user interface 500. Condition controls 508 and 510 are provided from the robot 100 and are arranged and connected by the user 106. In addition, a Twitter control 512 is provided by the robot 100 and may be configured by the user 106. The Twitter control 512 may obtain a Twitter feed from the user's Twitter account. The contents of the Twitter feed may be displayed on the smart mug via the display text control 504. When a certain string is posted to the Twitter feed and then displayed, the condition control 510 evaluates it and a conditional function is executed—the play music control 506 is invoked. The user 106 may configured the play music control 506 to play a certain chime, audio track, alert sound, music track, or the like. It is understood that Twitter is one example of a data feed that may be available. Other example data feeds include email, text messages, social media sites, answering services, and the like.

Figure 6:
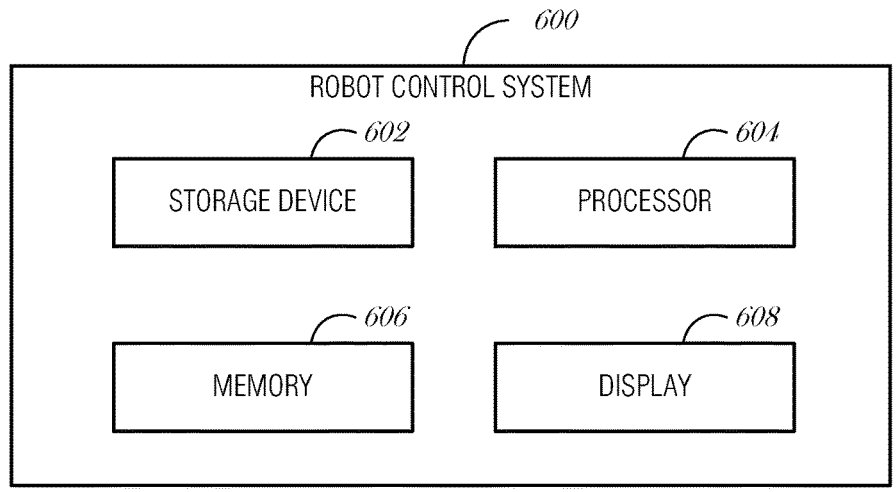
FIG. 6 is a block diagram illustrating a system for controlling a robot, according to an embodiment.

FIG. 6 is a block diagram illustrating a system 600 for controlling a robot, according to an embodiment. The system 600 includes a storage device 602, a processor 604, a memory 606, and a display 608. The memory 606 may include instructions, which when executed on the processor 604, cause the processor 604 to connect to a robot from the system. The system may be any type of user device. In an embodiment, the user device comprises a tablet device.

The processor 604 may then receive a user interface package from the robot, the user interface package obtained from a smart object by the robot. In an embodiment, the smart object comprises a smart mug.

In an embodiment, the user interface package includes a presentation component, the presentation component used by the user device to present a visual representation of the user interface package on the display of the user device.

In an embodiment, the user interface package includes a functional component, the functional component used by the user device to control an aspect of the instance of the user interface package. In an embodiment, the aspect includes a state of the instance of the user interface package. The state may include whether the user interface package is activated or deactivated, whether the user interface package has a comparison operator and if so, which comparison operator, and other state information.

In an embodiment, the aspect includes a data connection between the instance of the user interface package and a data source. For example, the data connection may be a connection to a social media platform, such as Twitter. The aspect may be configured with a username, password, chat handle, or other authentication and authorization tokens needed to connect to the data source.

In an embodiment, the processor 604 is configured to receive a robot user interface package, the robot user interface package being from the robot and exposing a function or control mechanism of the robot to the user device. In an embodiment, the robot user interface package includes a functional component that provides a condition user interface control to the user device. The condition user interface control may allow the user to set a conditional operator and one or more operands. The condition user interface control may use one or more inputs as operands for the conditional operator evaluation. In an embodiment, the condition user interface control receives a value as input and uses a conditional operator to compare the value with an operand to determine a logical result. For example, the input may be a current temperature of a thermostat, and the conditional operator may be an "equals" operation, and the other operand may be set by a user as "55° C.", such that when the temperature as read from the thermostat equals 55° C., an action is performed by the robot or the smart object.

The processor 604 may then present an instance of the user interface package on the display of the system. In an embodiment, to present the instance of the user interface package on the display of the user device, the processor 604 is configured to present a graphical node having an input connector and an output connector in a freeform design space in a user interface on the display. In an embodiment, the graphical node is configured using the presentation component. In an embodiment, the presentation component includes a state, the state configured by a user of the user device. In an embodiment, the state includes at least one of: a text font, a text string, a text style, or a text action.

The processor 604 may then receive user input to manipulate the instance of the user interface package. In an embodiment, to receive user input to manipulate the instance of the user interface package, the processor 604 is configured to receive touch input via the display, the display having a touchscreen input mechanism. In an embodiment, to receive user input to manipulate the instance of the user interface package, the processor 604 is configured to receive a series of inputs in a visual layout that create a connection between an instance of a first user interface package with an instance of a second user interface package, the connection defining an output of the instance of the first user interface package to be used as an input to the instance of the second user interface package.

In an embodiment, to receive user input to manipulate the instance of the user interface package, the processor 604 is configured to receive data from a user of the user device to define a property of the user interface package.

The processor 604 may then alter a function or state of the robot or the smart object based on the user input. In an embodiment, to alter the function or state of the robot or the smart object based on the user input, the processor 604 is configured to control the robot using a direct interaction mode. In an embodiment, to alter the function or state of the robot or the smart object based on the user input, the processor 604 is configured to control the robot using a general directive.

In an embodiment, to alter the function or state of the robot or the smart object based on the user input, the processor 604 is configured to configure the robot to: read data from the smart object: compare the data to a threshold condition: and cause the smart object to perform an action when the threshold condition is satisfied.

Figure 7:
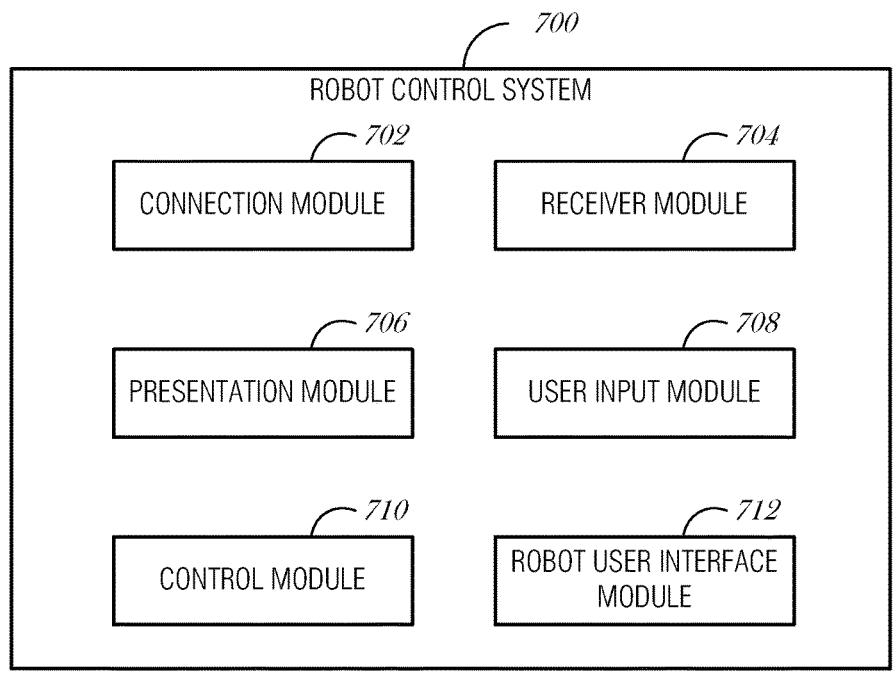
FIG. 7 is a block diagram illustrating a system for controlling a robot, according to an embodiment.

FIG. 7 is a block diagram illustrating a system 700 for controlling a robot, according to an embodiment. The system 700 may include a connection module 702, a receiver module 704, a presentation module 706, a user input module 708, and a control module 710. The connection module 702 may be configured to connect to a robot from a user device.

The receiver module 704 may be configured to receive a user interface package from the robot, the user interface package obtained from a smart object by the robot. In an embodiment, the user device comprises a tablet device. In an embodiment, the smart object comprises a smart mug. In an embodiment, the user interface package includes a presentation component, the presentation component used by the user device to present a visual representation of the user interface package on the display of the user device.

In an embodiment, the user interface package includes a functional component, the functional component used by the user device to control an aspect of the instance of the user interface package. In an embodiment, the aspect includes a state of the instance of the user interface package. In an embodiment, the aspect includes a data connection between the instance of the user interface package and a data source.

The presentation module 706 may be configured to present an instance of the user interface package on a display of the user device. In an embodiment, to present the instance of the user interface package on the display of the user device, the presentation module 706 is to present a graphical node having an input connector and an output connector in a freeform design space in a user interface on the display. In a further embodiment, the graphical node is configured using the presentation component. In a further embodiment, the presentation component includes a state, the state configured by a user of the user device. In a further embodiment, the state includes at least one of: a text font, a text string, a text style, or a text action.

The user input module 708 may be configured to receive user input to manipulate the instance of the user interface package. In an embodiment, to receive user input to manipulate the instance of the user interface package, the user input module 708 is to receive touch input via the display, the display having a touchscreen input mechanism. In a further embodiment, to receive user input to manipulate the instance of the user interface package, the user input module 708 is to receive a series of inputs in a visual layout that create a connection between an instance of a first user interface package with an instance of a second user interface package, the connection defining an output of the instance of the first user interface package to be used as an input to the instance of the second user interface package.

In an embodiment, to receive user input to manipulate the instance of the user interface package, the user input module 708 is to receive data from a user of the user device to define a property of the user interface package.

The control module 710 may be configured to alter a function or state of the robot or the smart object based on the user input. In an embodiment, to alter the function or state of the robot or the smart object based on the user input, the control module 710 is to configure the robot to: read data from the smart object: compare the data to a threshold condition; and cause the smart object to perform an action when the threshold condition is satisfied.

In an embodiment, to alter the function or state of the robot or the smart object based on the user input, the control module 710 is to control the robot using a direct interaction mode.

In an embodiment, to alter the function or state of the robot or the smart object based on the user input, the control module 710 is to control the robot using a general directive.

In a further embodiment, the system 700 include a robot user interface module 712 to receive a robot user interface package, the robot user interface package being from the robot and exposing a function or control mechanism of the robot to the user device. In a further embodiment, the robot user interface package includes a functional component that provides a condition user interface control to the user device. In an embodiment, the condition user interface control receives a value as input and uses a conditional operator to compare the value with an operand to determine a logical result.

Figure 8:
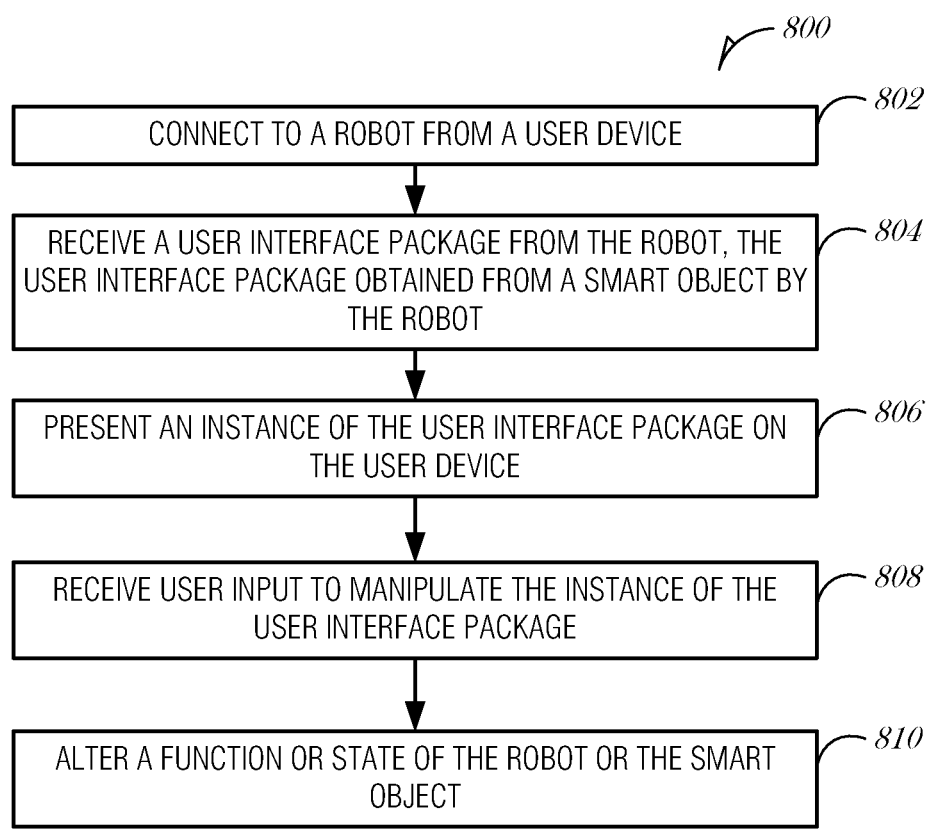
FIG. 8 is a flowchart illustrating a method of presenting a robot controller, according to an embodiment.

FIG. 8 is a flowchart illustrating a method 800 of presenting a robot controller, according to an embodiment. At block 802, a user device connects to a robot. In an embodiment, the user device comprises a tablet device.

At block 804, a user interface package is received from the robot, the user interface package obtained from a smart object by the robot. In an embodiment, the smart object comprises a smart mug.

In an embodiment, the user interface package includes a presentation component, the presentation component used by the user device to present a visual representation of the user interface package on the display of the user device.

In an embodiment, the user interface package includes a functional component, the functional component used by the user device to control an aspect of the instance of the user interface package. In an embodiment, the aspect includes a state of the instance of the user interface package. In an embodiment, the aspect includes a data connection between the instance of the user interface package and a data source.

In an embodiment, the method 800 includes receiving a robot user interface package, the robot user interface package being from the robot and exposing a function or control mechanism of the robot to the user device. In an embodiment, the robot user interface package includes a functional component that provides a condition user interface control to the user device. In an embodiment, the condition user interface control receives a value as input and uses a conditional operator to compare the value with an operand to determine a logical result.

At block 806, an instance of the user interface package is presented on a display of the user device. In an embodiment, presenting the instance of the user interface package on the display of the user device comprises: presenting a graphical node having an input connector and an output connector in a freeform design space in a user interface on the display. In a further embodiment, the graphical node is configured using the presentation component. In an embodiment, the presentation component includes a state, the state configured by a user of the user device. In an embodiment, the state includes at least one of: a text font, a text string, a text style, or a text action.

At block 808, user input to manipulate the instance of the user interface package is received. In an embodiment, receiving user input to manipulate the instance of the user interface package comprises: receiving touch input via the display, the display having a touchscreen input mechanism.

In an embodiment, receiving user input to manipulate the instance of the user interface package comprises: receiving a series of inputs in a visual layout that create a connection between an instance of a first user interface package with an instance of a second user interface package, the connection defining an output of the instance of the first user interface package to be used as an input to the instance of the second user interface package. The series of inputs may be a series of (x, y) coordinates corresponding to a dragging or swiping motion by the user on the display.

In an embodiment, receiving user input to manipulate the instance of the user interface package comprises: receiving data from a user of the user device to define a property of the user interface package. For example, the user may select an instance of the user interface package, select "Properties" from a contextual popup menu, and enter values for the properties in a property window.

At block 810, a function or state of the robot or the smart object is altered based on the user input. In an embodiment, altering the function or state of the robot or the smart object based on the user input comprises: configuring the robot to: read data from the smart object; compare the data to a threshold condition; and cause the smart object to perform an action when the threshold condition is satisfied.

In an embodiment, altering the function or state of the robot or the smart object based on the user input comprises controlling the robot using a direct interaction mode. In another embodiment, altering the function or state of the robot or the smart object based on the user input comprises controlling the robot using a general directive. Using general directives may be available on more autonomous robots.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules, components, or mechanisms may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 9:
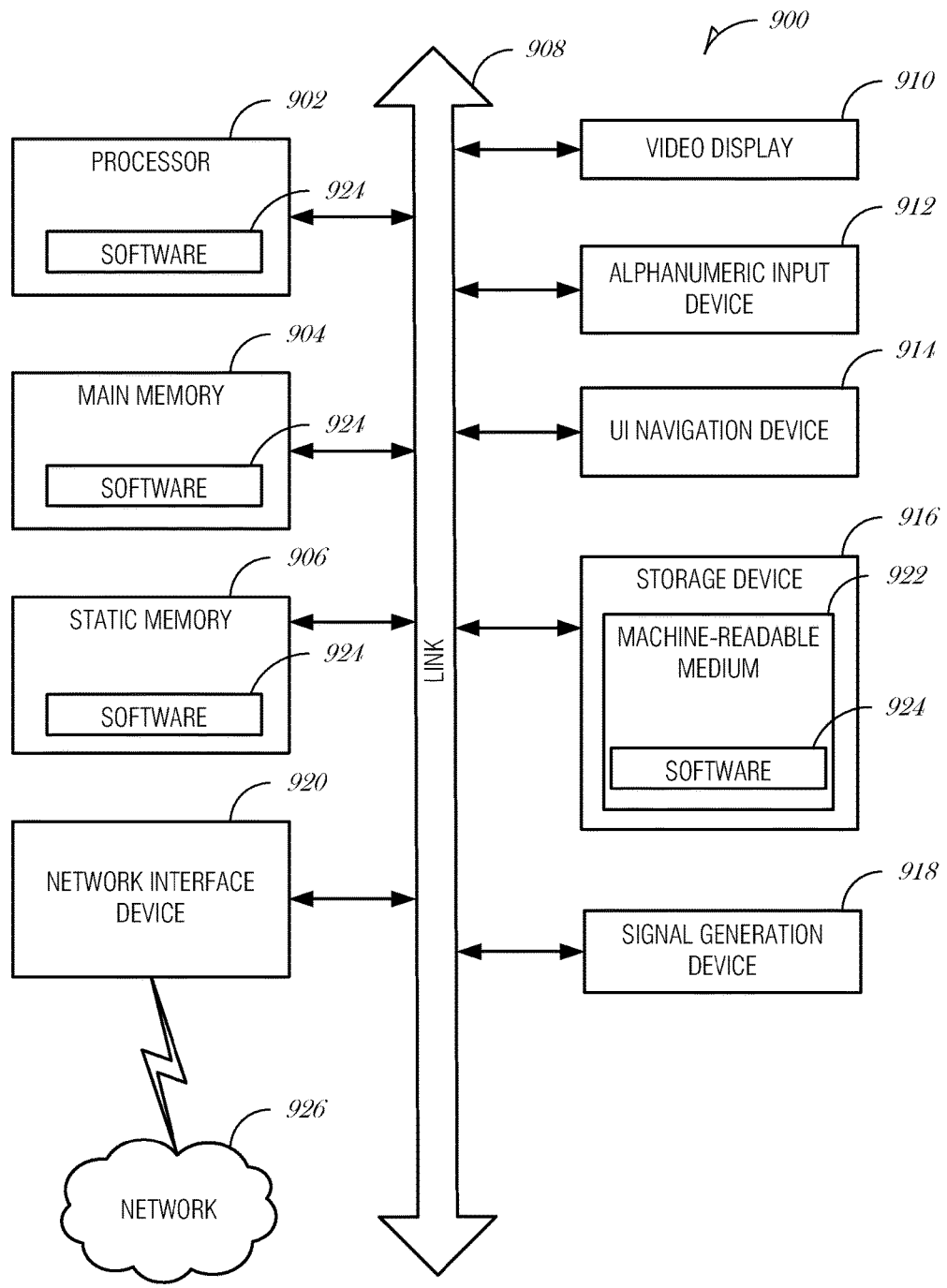
FIG. 9 is a block diagram illustrating an example machine upon which any one or more of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for controlling a robot (such as a device, apparatus, or machine) comprising: a storage device; a display; a processor; and a memory, including instructions, which when executed on the processor, cause the processor to: connect to a robot from the system; receive a user interface package from the robot, the user interface package obtained from a smart object by the robot; present an instance of the user interface package on the display of the system; receive user input to manipulate the instance of the user interface package; and alter a function or state of the robot or the smart object based on the user input.

In Example 2, the subject matter of Example 1 may include, wherein the system comprises a tablet device.

In Example 3, the subject matter of any one of Examples 1 to 2 may include, wherein the smart object comprises a smart mug.

In Example 4, the subject matter of any one of Examples 1 to 3 may include, wherein the user interface package includes a presentation component, the presentation component used by the user device to present a visual representation of the user interface package on the display of the user device.

In Example 5, the subject matter of any one of Examples 1 to 4 may include, wherein the user interface package includes a functional component, the functional component used by the user device to control an aspect of the instance of the user interface package.

In Example 6, the subject matter of any one of Examples 1 to 5 may include, wherein the aspect includes a state of the instance of the user interface package.

In Example 7, the subject matter of any one of Examples 1 to 6 may include, wherein the aspect includes a data connection between the instance of the user interface package and a data source.

In Example 8, the subject matter of any one of Examples 1 to 7 may include, instructions, which when executed on the processor, cause the processor to: receive a robot user interface package, the robot user interface package being from the robot and exposing a function or control mechanism of the robot to the user device.

In Example 9, the subject matter of any one of Examples 1 to 8 may include, wherein the robot user interface package includes a functional component that provides a condition user interface control to the user device.

In Example 11, the subject matter of any one of Examples 1 to 10 may include, wherein to present the instance of the user interface package on the display of the user device, the processor is to: present a graphical node having an input connector and an output connector in a freeform design space in a user interface on the display.

In Example 12, the subject matter of any one of Examples 1 to 11 may include, wherein the graphical node is configured using the presentation component.

In Example 13, the subject matter of any one of Examples 1 to 12 may include, wherein the presentation component includes a state, the state configured by a user of the user device.

In Example 14, the subject matter of any one of Examples 1 to 13 may include, wherein the state includes at least one of: a text font, a text string, a text style, or a text action.

In Example 15, the subject matter of any one of Examples 1 to 14 may include, wherein to receive user input to manipulate the instance of the user interface package, the processor is to: receive touch input via the display, the display having a touchscreen input mechanism.

In Example 16, the subject matter of any one of Examples 1 to 15 may include, wherein to receive user input to manipulate the instance of the user interface package, the processor is to: receive a series of inputs in a visual layout that create a connection between an instance of a first user interface package with an instance of a second user interface package, the connection defining an output of the instance of the first user interface package to be used as an input to the instance of the second user interface package.

In Example 17, the subject matter of any one of Examples 1 to 16 may include, wherein to receive user input to manipulate the instance of the user interface package, the processor is to: receive data from a user of the user device to define a property of the user interface package.

In Example 18, the subject matter of any one of Examples 1 to 17 may include, wherein to alter the function or state of the robot or the smart object based on the user input, the processor is to: configure the robot to: read data from the smart object; compare the data to a threshold condition: and cause the smart object to perform an action when the threshold condition is satisfied.

In Example 19, the subject matter of any one of Examples 1 to 18 may include, wherein to alter the function or state of the robot or the smart object based on the user input, the processor is to: control the robot using a direct interaction mode.

In Example 20, the subject matter of any one of Examples 1 to 19 may include, wherein to alter the function or state of the robot or the smart object based on the user input, the processor is to: control the robot using a general directive.

Example 21 includes subject matter for controlling a robot (such as a method, means for performing acts, machine readable medium including instructions that when performed by a machine cause the machine to performs acts, or an apparatus to perform) comprising: connecting to a robot from a user device: receiving a user interface package from the robot, the user interface package obtained from a smart object by the robot; presenting an instance of the user interface package on a display of the user device; receiving user input to manipulate the instance of the user interface package; and altering a function or state of the robot or the smart object based on the user input.

In Example 22, the subject matter of Example 21 may include, wherein the user device comprises a tablet device.

In Example 23, the subject matter of any one of Examples 21 to 22 may include, wherein the smart object comprises a smart mug.

In Example 24, the subject matter of any one of Examples 21 to 23 may include, wherein the user interface package includes a presentation component, the presentation component used by the user device to present a visual representation of the user interface package on the display of the user device.

In Example 25, the subject matter of any one of Examples 21 to 24 may include, wherein the user interface package includes a functional component, the functional component used by the user device to control an aspect of the instance of the user interface package.

In Example 26, the subject matter of any one of Examples 21 to 25 may include, wherein the aspect includes a state of the instance of the user interface package.

In Example 27, the subject matter of any one of Examples 21 to 26 may include, wherein the aspect includes a data connection between the instance of the user interface package and a data source.

In Example 28, the subject matter of any one of Examples 21 to 27 may include, receiving a robot user interface package, the robot user interface package being from the robot and exposing a function or control mechanism of the robot to the user device.

In Example 29, the subject matter of any one of Examples 21 to 28 may include, wherein the robot user interface package includes a functional component that provides a condition user interface control to the user device.

In Example 31, the subject matter of any one of Examples 21 to 30 may include, wherein presenting the instance of the user interface package on the display of the user device comprises: presenting a graphical node having an input connector and an output connector in a freeform design space in a user interface on the display.

In Example 32, the subject matter of any one of Examples 21 to 31 may include, wherein the graphical node is configured using the presentation component.

In Example 33, the subject matter of any one of Examples 21 to 32 may include, wherein the presentation component includes a state, the state configured by a user of the user device.

In Example 34, the subject matter of any one of Examples 21 to 33 may include, wherein the state includes at least one of: a text font, a text string, a text style, or a text action.

In Example 35, the subject matter of any one of Examples 21 to 34 may include, wherein receiving user input to manipulate the instance of the user interface package comprises: receiving touch input via the display, the display having a touchscreen input mechanism.

In Example 36, the subject matter of any one of Examples 21 to 35 may include, wherein receiving user input to manipulate the instance of the user interface package comprises: receiving a series of inputs in a visual layout that create a connection between an instance of a first user interface package with an instance of a second user interface package, the connection defining an output of the instance of the first user interface package to be used as an input to the instance of the second user interface package.

In Example 37, the subject matter of any one of Examples 21 to 36 may include, wherein receiving user input to manipulate the instance of the user interface package comprises: receiving data from a user of the user device to define a property of the user interface package.

In Example 38, the subject matter of any one of Examples 21 to 37 may include, wherein altering the function or state of the robot or the smart object based on the user input comprises: configuring the robot to: read data from the smart object: compare the data to a threshold condition; and cause the smart object to perform an action when the threshold condition is satisfied.

In Example 39, the subject matter of any one of Examples 21 to 38 may include, wherein altering the function or state of the robot or the smart object based on the user input comprises: controlling the robot using a direct interaction mode.

In Example 40, the subject matter of any one of Examples 21 to 39 may include, wherein altering the function or state of the robot or the smart object based on the user input comprises: controlling the robot using a general directive.

Example 41 includes at least one machine-readable medium including instructions, which when executed by a machine, cause the machine to perform operations of any of the Examples 21-40.

Example 42 includes an apparatus comprising means for performing any of the Examples 21-40.

Example 43 includes subject matter for controlling a robot (such as a device, apparatus, or machine) comprising: means for connecting to a robot from a user device; means for receiving a user interface package from the robot, the user interface package obtained from a smart object by the robot: means for presenting an instance of the user interface package on a display of the user device: means for receiving user input to manipulate the instance of the user interface package: and means for altering a function or state of the robot or the smart object based on the user input.

In Example 44, the subject matter of Example 43 may include, wherein the user device comprises a tablet device.

In Example 45, the subject matter of any one of Examples 43 to 44 may include, wherein the smart object comprises a smart mug.

In Example 46, the subject matter of any one of Examples 43 to 45 may include, wherein the user interface package includes a presentation component, the presentation component used by the user device to present a visual representation of the user interface package on the display of the user device.

In Example 47, the subject matter of any one of Examples 43 to 46 may include, wherein the user interface package includes a functional component, the functional component used by the user device to control an aspect of the instance of the user interface package.

In Example 48, the subject matter of any one of Examples 43 to 47 may include, wherein the aspect includes a state of the instance of the user interface package.

In Example 49, the subject matter of any one of Examples 43 to 48 may include, wherein the aspect includes a data connection between the instance of the user interface package and a data source.

In Example 50, the subject matter of any one of Examples 43 to 49 may include, means for receiving a robot user interface package, the robot user interface package being from the robot and exposing a function or control mechanism of the robot to the user device.

In Example 51, the subject matter of any one of Examples 43 to 50 may include, wherein the robot user interface package includes a functional component that provides a condition user interface control to the user device.

In Example 53, the subject matter of any one of Examples 43 to 52 may include, wherein the means for presenting the instance of the user interface package on the display of the user device comprise: means for presenting a graphical node having an input connector and an output connector in a freeform design space in a user interface on the display.

In Example 54, the subject matter of any one of Examples 43 to 53 may include, wherein the graphical node is configured using the presentation component.

In Example 55, the subject matter of any one of Examples 43 to 54 may include, wherein the presentation component includes a state, the state configured by a user of the user device.

In Example 56, the subject matter of any one of Examples 43 to 55 may include, wherein the state includes at least one of: a text font, a text string, a text style, or a text action.

In Example 57, the subject matter of any one of Examples 43 to 56 may include, wherein the means for receiving user input to manipulate the instance of the user interface package comprise: means for receiving touch input via the display, the display having a touchscreen input mechanism.

In Example 58, the subject matter of any one of Examples 43 to 57 may include, wherein the means for receiving user input to manipulate the instance of the user interface package comprise: means for receiving a series of inputs in a visual layout that create a connection between an instance of a first user interface package with an instance of a second user interface package, the connection defining an output of the instance of the first user interface package to be used as an input to the instance of the second user interface package.

In Example 59, the subject matter of any one of Examples 43 to 58 may include, wherein the means for receiving user input to manipulate the instance of the user interface package comprise: means for receiving data from a user of the user device to define a property of the user interface package.

In Example 60, the subject matter of any one of Examples 43 to 59 may include, wherein the means for altering the function or state of the robot or the smart object based on the user input comprise: means for configuring the robot to: read data from the smart object; compare the data to a threshold condition; and cause the smart object to perform an action when the threshold condition is satisfied.

In Example 61, the subject matter of any one of Examples 43 to 60 may include, wherein the means for altering the function or state of the robot or the smart object based on the user input comprise: means for controlling the robot using a direct interaction mode.

In Example 62, the subject matter of any one of Examples 43 to 61 may include, wherein the means for altering the function or state of the robot or the smart object based on the user input comprise: means for controlling the robot using a general directive.

Example 63 includes subject matter for controlling a robot (such as a device, apparatus, or machine) comprising: a connection module to connect to a robot from a user device; a receiver module to receive a user interface package from the robot, the user interface package obtained from a smart object by the robot; a presentation module to present an instance of the user interface package on a display of the user device; a user input module to receive user input to manipulate the instance of the user interface package; and a control module to alter a function or state of the robot or the smart object based on the user input.

In Example 64, the subject matter of Example 63 may include, wherein the user device comprises a tablet device.

In Example 65, the subject matter of any one of Examples 63 to 64 may include, wherein the smart object comprises a smart mug.

In Example 66, the subject matter of any one of Examples 63 to 65 may include, wherein the user interface package includes a presentation component, the presentation component used by the user device to present a visual representation of the user interface package on the display of the user device.

In Example 67, the subject matter of any one of Examples 63 to 66 may include, wherein the user interface package includes a functional component, the functional component used by the user device to control an aspect of the instance of the user interface package.

In Example 68, the subject matter of any one of Examples 63 to 67 may include, wherein the aspect includes a state of the instance of the user interface package.

In Example 69, the subject matter of any one of Examples 63 to 68 may include, wherein the aspect includes a data connection between the instance of the user interface package and a data source.

In Example 70, the subject matter of any one of Examples 63 to 69 may include, a robot user interface module to receive a robot user interface package, the robot user interface package being from the robot and exposing a function or control mechanism of the robot to the user device.

In Example 71, the subject matter of any one of Examples 63 to 70 may include, wherein the robot user interface package includes a functional component that provides a condition user interface control to the user device.

In Example 73, the subject matter of any one of Examples 63 to 72 may include, wherein to present the instance of the user interface package on the display of the user device, the presentation module is to: present a graphical node having an input connector and an output connector in a freeform design space in a user interface on the display.

In Example 74, the subject matter of any one of Examples 63 to 73 may include, wherein the graphical node is configured using the presentation component.

In Example 75, the subject matter of any one of Examples 63 to 74 may include, wherein the presentation component includes a state, the state configured by a user of the user device.

In Example 76, the subject matter of any one of Examples 63 to 75 may include, wherein the state includes at least one of: a text font, a text string, a text style, or a text action.

In Example 77, the subject matter of any one of Examples 63 to 76 may include, wherein to receive user input to manipulate the instance of the user interface package, the user input module is to: receive touch input via the display, the display having a touchscreen input mechanism.

In Example 78, the subject matter of any one of Examples 63 to 77 may include, wherein to receive user input to manipulate the instance of the user interface package, the user input module is to: receive a series of inputs in a visual layout that create a connection between an instance of a first user interface package with an instance of a second user interface package, the connection defining an output of the instance of the first user interface package to be used as an input to the instance of the second user interface package.

In Example 79, the subject matter of any one of Examples 63 to 78 may include, wherein to receive user input to manipulate the instance of the user interface package, the user input module is to: receive data from a user of the user device to define a property of the user interface package.

In Example 80, the subject matter of any one of Examples 63 to 79 may include, wherein to alter the function or state of the robot or the smart object based on the user input, the control module is to: configure the robot to: read data from the smart object; compare the data to a threshold condition: and cause the smart object to perform an action when the threshold condition is satisfied.

In Example 81, the subject matter of any one of Examples 63 to 80 may include, wherein to alter the function or state of the robot or the smart object based on the user input, the control module is to: control the robot using a direct interaction mode.

In Example 82, the subject matter of any one of Examples 63 to 81 may include, wherein to alter the function or state of the robot or the smart object based on the user input, the control module is to: control the robot using a general directive.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for controlling a robot, the system comprising:
    a storage device;
    a display;
    a processor; and
    a memory, including instructions, which when executed on the processor, cause the processor to:
    connect to the robot from the system;
    receive a robot user interface package, the robot user interface package being from the robot and exposing a function or control mechanism of the robot to a user device, wherein the robot user interface package includes a functional component that provides a condition user interface control to the user device, wherein the condition user interface control receives a value as input and uses a conditional operator to compare the value with an operand to determine a logical result;
    receive a user interface package from the robot, the user interface package obtained from a smart object by the robot;
    present an instance of the user interface package on the display of the system;
    receive user input to manipulate the instance of the user interface package; and
    alter a function or state of the robot or the smart object based on the user input.

2. The system of claim 1, wherein the smart object comprises a smart mug.

3. The system of claim 1, wherein the user interface package includes a presentation component, the presentation component used by the user device to present a visual representation of the user interface package on the display of the user device.

4. The system of claim 1, wherein the user interface package includes a functional component, the functional component used by the user device to control an aspect of the instance of the user interface package.

5. The system of claim 4, wherein the aspect includes a state of the instance of the user interface package.

6. The system of claim 4, wherein the aspect includes a data connection between the instance of the user interface package and a data source.

7. The system of claim 1, wherein to present the instance of the user interface package on the display of the user device, the processor is to:
    present a graphical node having an input connector and an output connector in a freeform design space in a user interface on the display.

8. The system of claim 1, wherein to receive user input to manipulate the instance of the user interface package, the processor is to:
    receive touch input via the display, the display having a touchscreen input mechanism.

9. The system of claim 8, wherein to receive user input to manipulate the instance of the user interface package, the processor is to:
    receive a series of inputs in a visual layout that create a connection between an instance of a first user interface package with an instance of a second user interface package, the connection defining an output of the instance of the first user interface package to be used as an input to the instance of the second user interface package.

10. The system of claim 1, wherein to alter the function or state of the robot or the smart object based on the user input, the processor is to:
    configure the robot to:
        read data from the smart object;
        compare the data to a threshold condition; and
        cause the smart object to perform an action when the threshold condition is satisfied.

11. The system of claim 1, wherein to alter the function or state of the robot or the smart object based on the user input, the processor is to:
    control the robot using a direct interaction mode.

12. A method of providing a robot controller, the method performed by a user device, the method comprising:
- connecting to a robot from the user device;
- receiving a robot user interface package, the robot user interface package being from the robot and exposing a function or control mechanism of the robot to the user device, wherein the robot user interface package includes a functional component that provides a condition user interface control to the user device, wherein the condition user interface control receives a value as input and uses a conditional operator to compare the value with an operand to determine a logical result;
- receiving a user interface package from the robot, the user interface package obtained from a smart object by the robot;
- presenting an instance of the user interface package on a display of the user device;
- receiving user input to manipulate the instance of the user interface package; and
- altering a function or state of the robot or the smart object based on the user input.

13. The method of claim 12, wherein the user interface package includes a presentation component, the presentation component used by the user device to present a visual representation of the user interface package on the display of the user device.

14. The method of claim 13, wherein the aspect includes a data connection between the instance of the user interface package and a data source.

15. The method of claim 12, wherein the user interface package includes a functional component, the functional component used by the user device to control an aspect of the instance of the user interface package.

16. The method of claim 15, wherein the aspect includes a state of the instance of the user interface package.

17. At least one non-transitory machine-readable medium including instructions, which when executed by a machine, cause the machine to:
- connect to a robot from the system;
- receive a robot user interface package, the robot user interface package being from the robot and exposing a function or control mechanism of the robot to a user device, wherein the robot user interface package includes a functional component that provides a condition user interface control to the user device, wherein the condition user interface control receives a value as input and uses a conditional operator to compare the value with an operand to determine a logical result;
- receive a user interface package from the robot, the user interface package obtained from a smart object by the robot;
- present an instance of the user interface package on the display of the system;
- receive user input to manipulate the instance of the user interface package; and
- alter a function or state of the robot or the smart object based on the user input.

18. The at least one non-transitory machine-readable medium of claim 17, wherein to present the instance of the user interface package on the display of the user device, the machine is to:
- present a graphical node having an input connector and an output connector in a freeform design space in a user interface on the display.

* * * * *